(12) United States Patent
Dachtchenko et al.

(10) Patent No.: US 6,772,717 B2
(45) Date of Patent: Aug. 10, 2004

(54) RECIPROCATING PISTON INTERNAL COMBUSTION ENGINE

(75) Inventors: Oleg Dachtchenko, Stuttgart-Plieningen (DE); Willi Gelse, Schorndorf (DE); Vadim Kutenev, Moscow (RU); Klaus Magg, Stuttgart (DE); Andrej Nikitin, Moscow (RU); Erhard Rau, Weilheim (DE); Yuri Romanchev, Moscow (RU); Hubert Schnüpke, Stuttgart (DE); George Ter-Mkretiehian, Moscow (RU); Michail Zienko, Moscow (RU)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/360,593

(22) Filed: Feb. 7, 2003

(65) Prior Publication Data

US 2003/0200942 A1 Oct. 30, 2003

Related U.S. Application Data

(63) Continuation-in-part of application No. PCT/EP01/09166, filed on Aug. 8, 2001.

(51) Int. Cl.$^7$ ............................................... F02B 75/04
(52) U.S. Cl. ................................ 123/48 B; 123/78 F
(58) Field of Search ........................... 123/48 B, 78 E, 123/78 F (56) References Cited

U.S. PATENT DOCUMENTS

| | | | | |
|---|---|---|---|---|
| 1,901,263 A | * | 3/1933 | Severin Ruud Otto | .... 123/78 F |
| 4,517,931 A | | 5/1985 | Nelson | |
| 5,595,146 A | | 1/1997 | Bollig et al. | |

FOREIGN PATENT DOCUMENTS

| | | |
|---|---|---|
| DE | 42 12 954 A1 | 10/1994 |
| DE | 299 13 107 U1 | 11/1999 |
| EP | 1 143 127 A1 | 10/2001 |
| FR | 2 802 973 | 6/2001 |
| JP | 09228858 | 9/1997 |

OTHER PUBLICATIONS

Alfred Jante, "Kraftstoffverbrauchssenkung Von Verbrennungsmotoren Durch Kinematische Mittel", Automobil–Industrie 1/80, pp. 61–65.

F.G. Wirbeleit et al. "Development of Pistons with Variable Compression Height for Increasing Efficiency and Specific power output of Combustion Engines", DB Research Labs, Mar. 1990.

Christoph Bollig et al. "Kurbeltrieb Für Variable Verdichtung", MTZ Motortechnische Zeitschrift 58 (1997) 11.

Kraftstoffverbrauchssenkung von Verbrennungsmotoren durch kinematiche Mittel, Automobilindustrie 1/80, Kraftstoffverbraunch pp. 61–65.

* cited by examiner

Primary Examiner—Noah P. Kamen
(74) Attorney, Agent, or Firm—Klaus J. Bach (57) ABSTRACT

In a reciprocating piston internal combustion engine with a piston which is displacably arranged in a cylinder and is coupled in to a connecting rod whose movement can be transmitted to a crankshaft via a crank, a transmission element is provided between the connecting rod and the crank of the crankshaft and the movement of the transmission element can be manipulated by means of a control arm for an adjustment of the compression ratio of the engine. The transmission element is coupled to the crank via a joint disposed in the intermediate region between a bearing connection of the transverse lever structure with the control arm and a bearing connection of the transverse lever with the connecting rod, the bearing connection of the transverse lever with the connecting rod, the crank and the control arm being arranged in a predetermined relationship.

13 Claims, 10 Drawing Sheets

Fig. 1

Prior Art

Fig. 2

Prior Art

Fig. 3

Prior Art

RECIPROCATING PISTON INTERNAL COMBUSTION ENGINE

This is a continuation-in-part application of international application PCT/EP01/09166 filed Aug. 8, 2001 and claiming the priority of Russian application 2000/20771 filed Aug. 8, 2000.

BACKGROUND OF THE INVENTION

The invention relates to an internal combustion engine, that is, to a reciprocating piston internal combustion engine with a variable compression ratio.

The publication F. G. Wirbeleit, K. Binder and D. Gwinner "Development of Piston with Variable Compression Height for increasing Efficiency and Specific Power Output of Combustion Engines", SAE Tech. Pap., 900229 [1] discloses such a reciprocating piston internal combustion engine with a compression ratio, which is variable by changing the piston height. The piston of the internal combustion engine is comprised of two parts with hydraulic chambers disposed between them. The compression ratio is changed automatically by changing the position of one part of the piston with respect to the other part by the transfer of the fluid from one chamber to another.

The disadvantages of this known prototype include the fact that the system for varying the compression is disposed in a high temperature area (in the cylinder). Experience shows that the system described has a tendency, for example, to knock when changing the driving mode, for example during acceleration, as the control of the hydraulic system does not permit a rapid change of the compression ratio for all the cylinders at the same time.

The intention of removing the compression control mechanism from the high temperature area has led to another series of technical solutions, which provide a change in the kinematics of the internal combustion engine. These solutions include additional elements in the piston operating mechanism and means for influencing them so as to permit changing the compression ratio of the engine.

Figure 1:
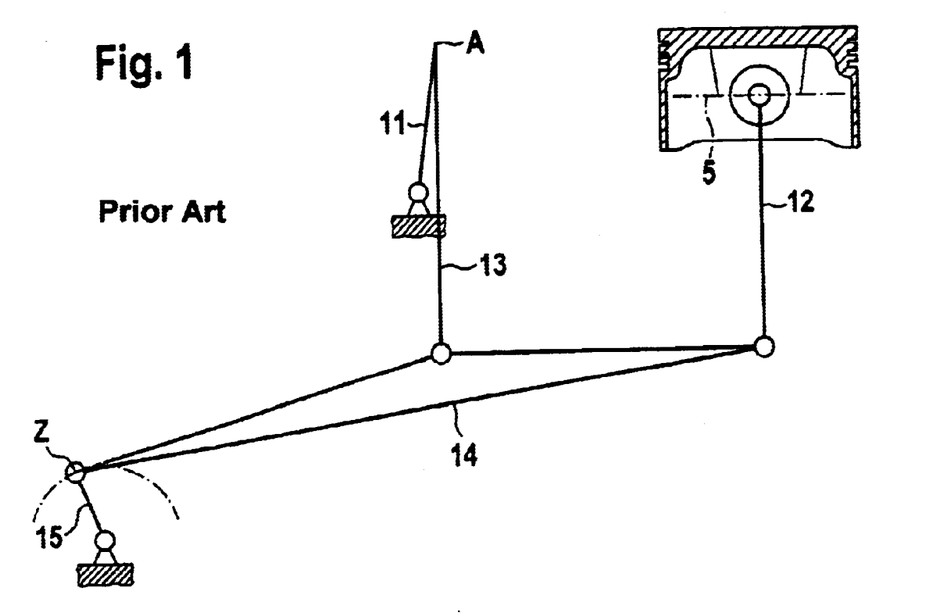
FIGS. 1, 2 and 3 show schematically prior art arrangements of piston operating arrangements with variable compression ratios.

An internal combustion engine of a type [2] (FIG. 1), A. Jante "Kraftstoffsverbrauchsenkung von Verbrennungsmotoren durch kinematische Mittel", Automobilindustrie 1980, N1, pp. 61–65, is also known. This internal combustion engine includes two additional elements (additional connecting rod 13 and pivot lever 14) between the crank 15 and the connecting rod 12. The pivot lever 14 executes a pivoting movement starting from the articulation point Z. The compression ratio is varied on the basis of the basic position of the bearing point A being changed when the crank 15, which is attached to the casing of the internal combustions engine, is adjusted. The crank 15 rotates as a function of the engine load and in the process the articulation point Z moves on a circular path.

Figure 2:
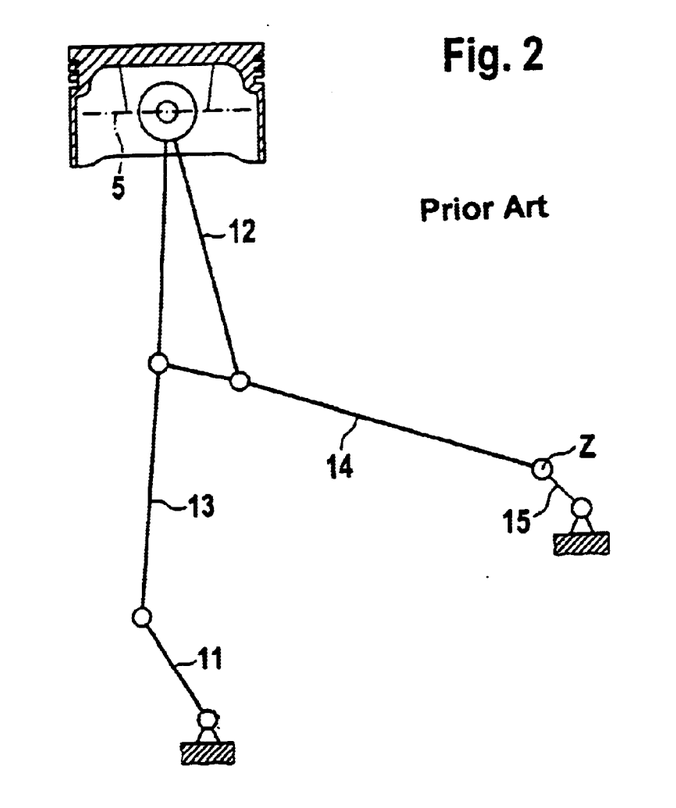

The publication [3] Christoph Bolling et al. "Kurbeltrieb für variable Verdichtung", MTZ 58 (1997) 11, pp 706–711 discloses an internal combustion engine of the type FEV (FIG. 2) which includes an additional connecting rod 13 between the crank 11 and the connecting rod 12. The connecting rod 12 is additionally connected to the pivot lever 14, which executes a pivoting movement starting from the articulation point Z. The compression ratio is varied on the basis of the basic position of this articulation point Z being changed when the crank 15, which is attached to the casing of the internal combustion engine, is adjusted. The crank 15 rotates as a function of the engine load, and in the process, the articulation point Z moves on a circular path.

Figure 3:
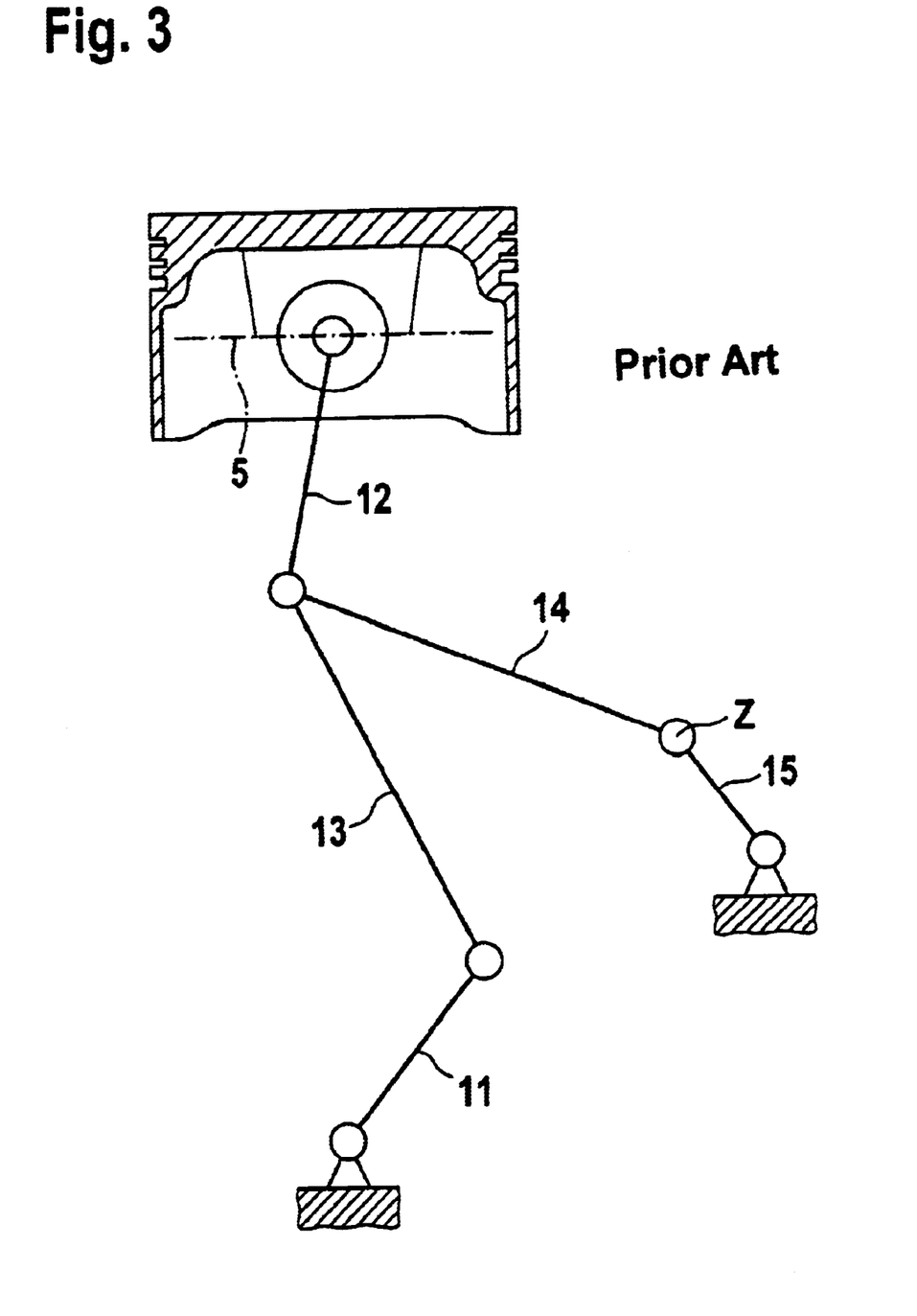

The publication N DE4312954 A1 discloses an internal combustion engine of the type IFA [4] (FIG. 3) which includes an additional connecting rod 13 between the crank 11 and the connecting rod 12. The connecting rod 12 is additionally connected to one end of the pivot lever 14, the other end of which executes a pivoting movement starting from the articulation point Z. The compression ratio is varied on the basis of the basic position of the articulation point Z being changed when the crank 16, which is attached to the casing of the internal combustion engine, is adjusted. The crank 16 rotates as a function of the engine load, and in the process the articulation point Z moves on a circular path.

The disadvantages of the engines [2–4] described include primarily poor smoothness of running, which is due to the high second order oscillation forces of the masses which are moved in a translatory fashion by the kinematics of the operating mechanism. The arrangement furthermore requires an increase in the overall width or overall height of the assembly. This makes it impossible to use these internal combustion engines in the field of transportation.

A variable compression ratio in a reciprocating piston internal combustion engine however is advantageous because it can achieve the following objectives:

the average pressure Pe is increased as a result of an increase in the charge pressure without raising the maximum combustion pressure by reducing the compression ratio when the engine load increases;

the fuel consumption is reduced during low and medium load operation by increasing the compression when the engine load drops;

the operating smoothness of the engine is improved.

Figure 4A:
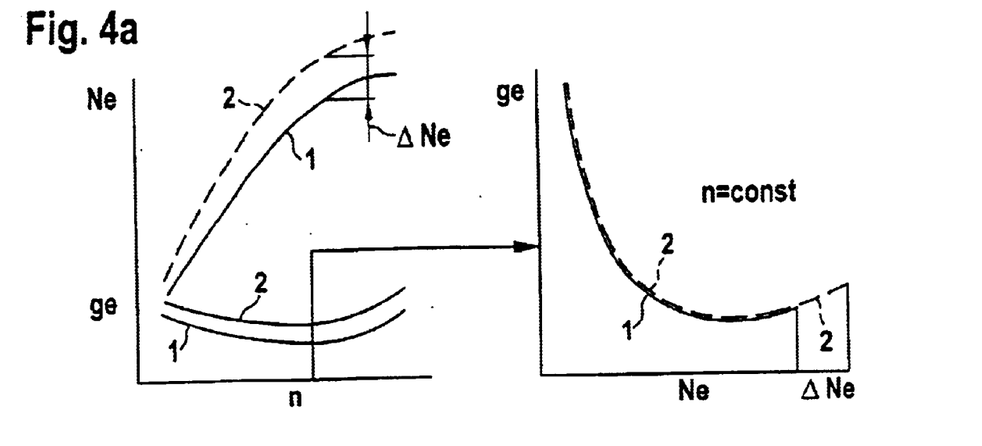
FIGS. 4a, 4b and 4c show various advantages obtained with a gasoline engine having a variable compression ratio.

Depending on the type of internal combustion engine, the following advantages (for internal combustion engines operating according to the spark ignition principle) are obtained by virtue of the variable compression ratio:

While maintaining an economical operation of the engine which is achieved with low and medium loads, a further increase in the engine power is achieved by increasing the charge pressure while reducing the compression ratio (FIG. 4a).

Figure 4B:
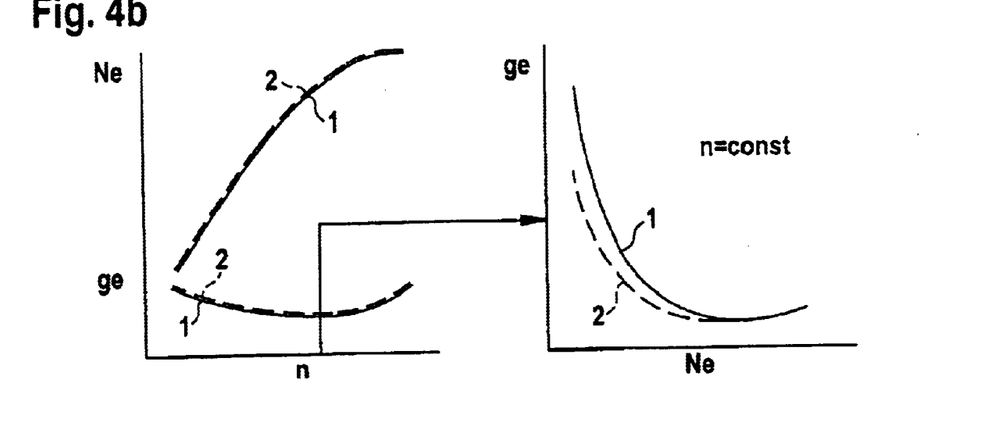

While maintaining the nominal power level of the engine which is achieved with low and medium loads, the fuel consumption is improved by increasing the compression up to the permitted knocking level (FIG. 4b).

Figure 4C:
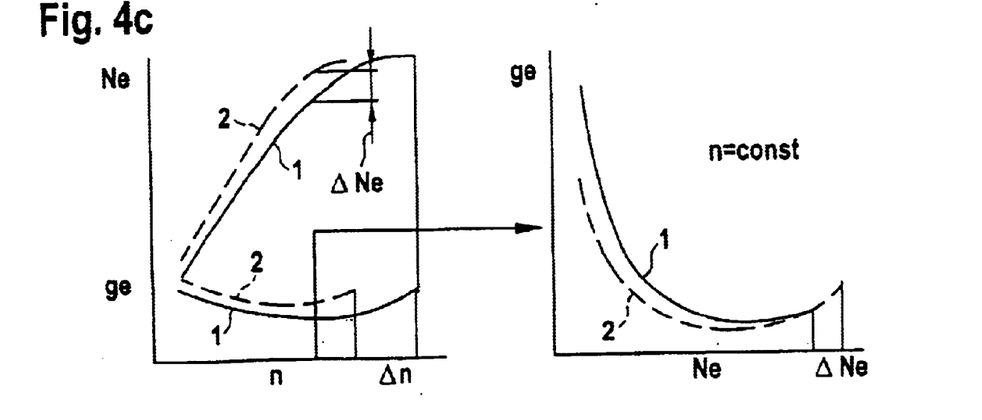

While maintaining the nominal power level of the engine, the economical operation with low and medium loads is improved and the noise level is reduced while the nominal rotational speed is simultaneously reduced (FIG. 4c).

Figure 5A:
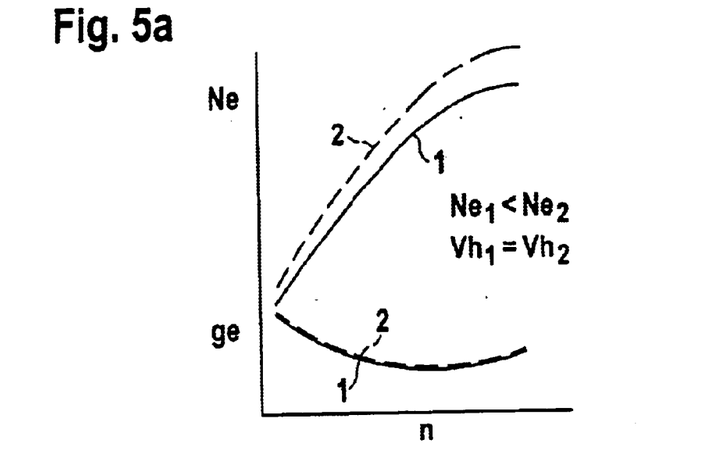
FIGS. 5a, 5b and 5c show various advantages obtained with a diesel engine having a variable compression ratio.

For internal combustion engines operating according to the diesel principle, the variation of the compression can be developed in three equally prioritized directions:

Given a constant displacement and nominal rotational speed, the engine power is increased by the increase in the charge pressure. In this case, it is not the fuel consumption but rather the power output of the engine, which is improved (FIG. 5a).

Figure 5B:
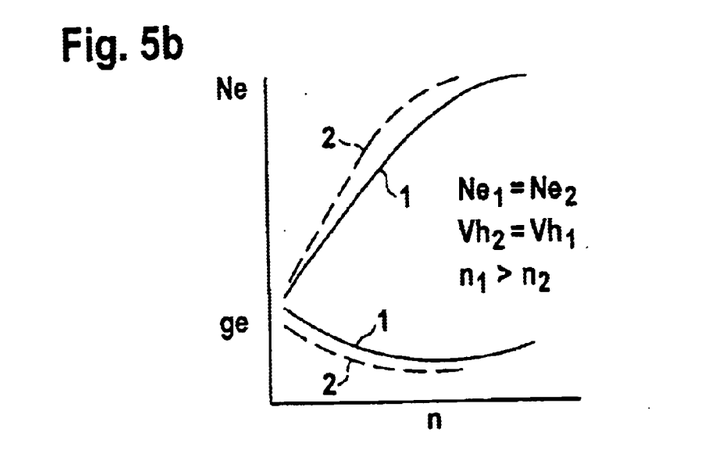
Figure 5C:
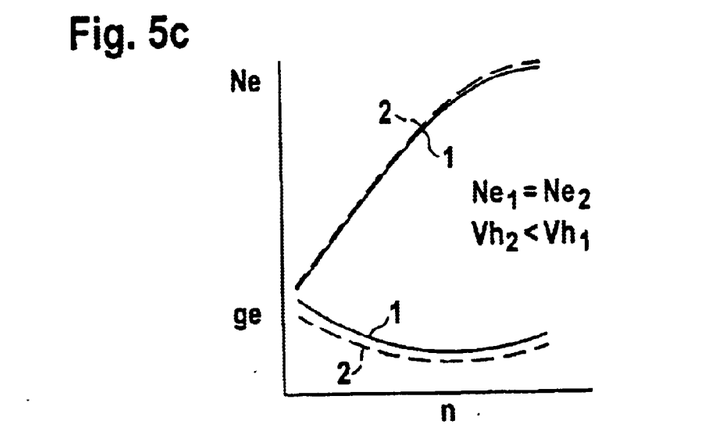

Given a constant displacement and nominal power, the average pressure Pe is increased while the nominal rotational speed is lowered (FIG. 5b). In this case, while maintaining the power output of the vehicle, the economical operation of the engine is improved by increasing the mechanical efficiency (FIG. 5b).

An existing engine with a large displacement is replaced by an engine with a smaller displacement with the same power. In this case, the economical operation of the engine under medium and full loads is improved and the weight and the external dimensions of the engine are reduced.

It is the object of the invention to provide a reciprocating piston internal combustion engine, which includes a variable compression ratio that can be controlled with little structural expenditure, while the second order bearing forces and mass forces are reduced.

SUMMARY OF THE INVENTION

In a reciprocating piston internal combustion engine with a piston which is displaceably arranged in a cylinder and is coupled in an articulated fashion to a connecting rod whose movement can be transmitted to a crankshaft via a crank, a transmission element is provided between the connecting rod and a crank of the crankshaft and the movement of the transmission element can be manipulated by means of a control arm for an adjustment of the compression ratio of the engine.

In order to reduce second order forces, the transmission element is a transverse lever structure, which is coupled to the crankshaft via a joint, that is disposed in the intermediate region between a bearing connection of the transverse lever structure with the control arm and a bearing connection of the transverse lever with the connecting rod, the bearing connection of the transverse lever with the connecting rod, the crank and the control arm being arranged in a predetermined relationship.

DESCRIPTION OF PREFERRED EMBODIMENTS

The novel reciprocating piston internal combustion engine 1 includes (FIG. 6a) a casing 2 with a cylinder 3 and a piston 4 movably disposed in the cylinder 3. A connecting rod 6, which is connected to the piston 4 via a joint, a crank 8 in the casing 2, an articulation connecting rod 10 which is connected with one end to the casing 2 via a joint Z and with its other end to the triangular transverse lever 7. The triangular transverse lever has first, second and third joints, of which the first joint is connected to the other end of the connecting rod 6, the second joint to the crank 8 and the third joint is connected to the articulation connecting rod 10 via joint C. In order to permit a variable compression ratio, the pivot axis Z of the articulation connecting rod 6 can move on a control path, for example by means of a cam or on an additional crank 17.

Depending on the location of the pivot joint axis Z of the control lever (crank 17), the novel reciprocating piston internal combustion engine has two basic configurations (FIGS. 6a, 6b):

the configuration 1 (FIG. 6a), in which the oscillation axis Z of the articulation connecting rod 10 is above the connecting point of the crank 8 and of the transverse lever 7 in the upper dead center position of the crank, or, in other words, the articulation connecting rod 10 and the connecting rod 6 are disposed on the same side of the transverse lever 7;

the configuration 2 (FIG. 6b), in which the oscillation axis Z of the articulation connecting rod 10 is below the connecting point of the crank 8 and of the transverse lever 7 in the upper dead center position of the crank, or in other words the articulation connecting rod 10 and the connecting rod 6 are disposed at opposite sides of the transverse lever 7;

By means of the articulation point Z, the compression ratio can be adjusted using a simple control movement by means of the additional crank 17 or 11 (FIG. 6b) or an adjustment cam. In addition, the articulation point Z can execute a continuous cyclical movement, which is synchronized with the rotary movement of the crankshaft.

As is apparent from FIG. 7, the novel reciprocating piston internal combustion engine according to claim 1 has considerable advantages over the described systems [2–4] and the conventional crank drive, in particular with respect to smooth operation of the internal combustion engine.

These advantages however can be achieved only by complying with specific geometric conditions, specifically with a correct selection of the lengths of individual elements and their position with respect to the axis of the crankshaft.

Figure 8:
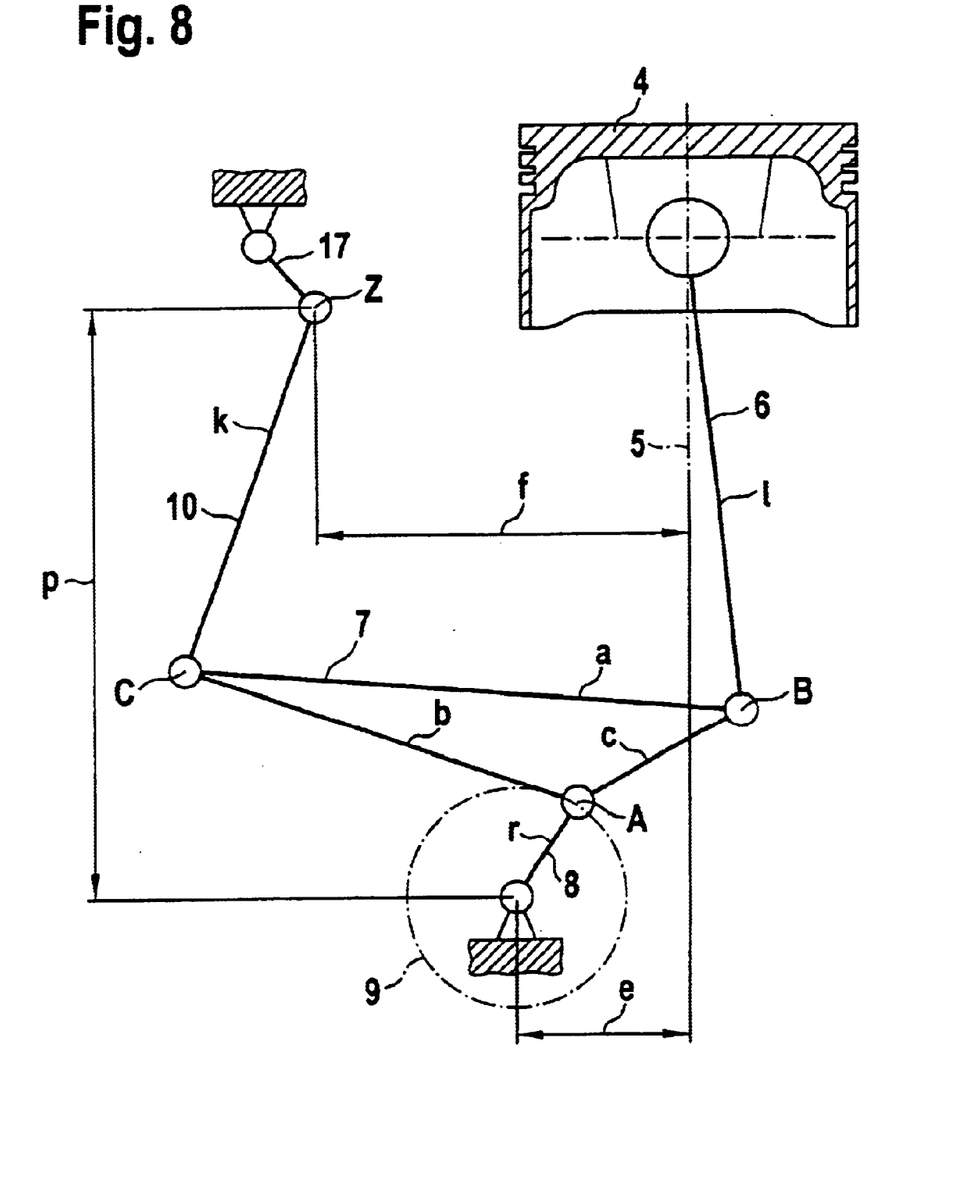
FIG. 8 shows schematically the arrangement according to the invention for the definition of the dimensions considered to be optimal.

The quintessence of the invention is to determine the dimensions of individual elements (in relation to the crank radius) and the coordinates of individual joints of the force transmission mechanism. The dimensions of the various elements that is the mechanism is optimized by means of kinematic and dynamic analysis. The optimization of the mechanism (FIG. 8) which is defined with nine parameters has the objective of achieving the smallest forces (loads) on individual elements of the mechanism in order to provide for the desired running smoothness.

Figure 6A:
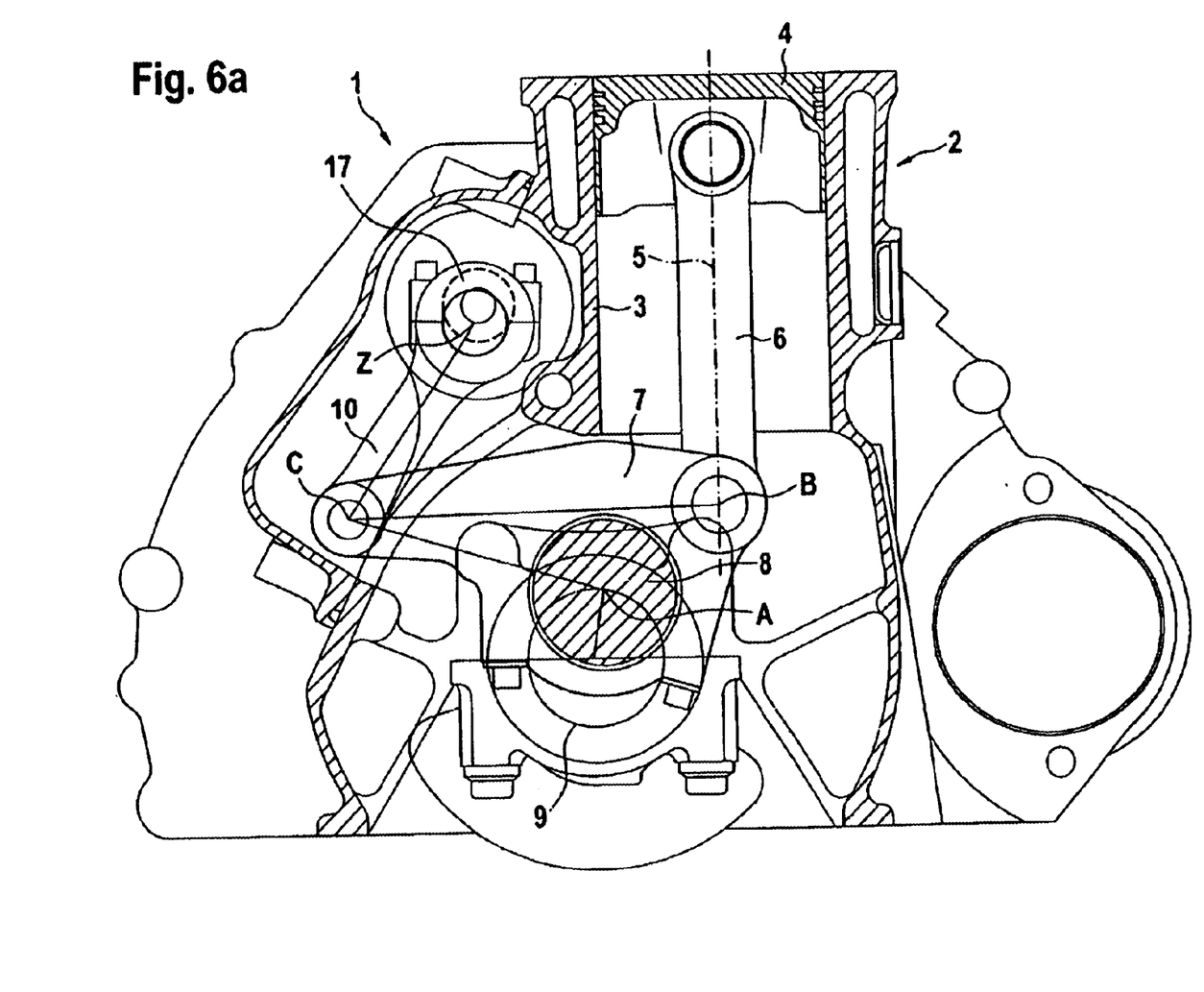
FIGS. 6a and 6b show engines with variable compression ratios including compact operating mechanisms according to the invention.
Figure 6B:
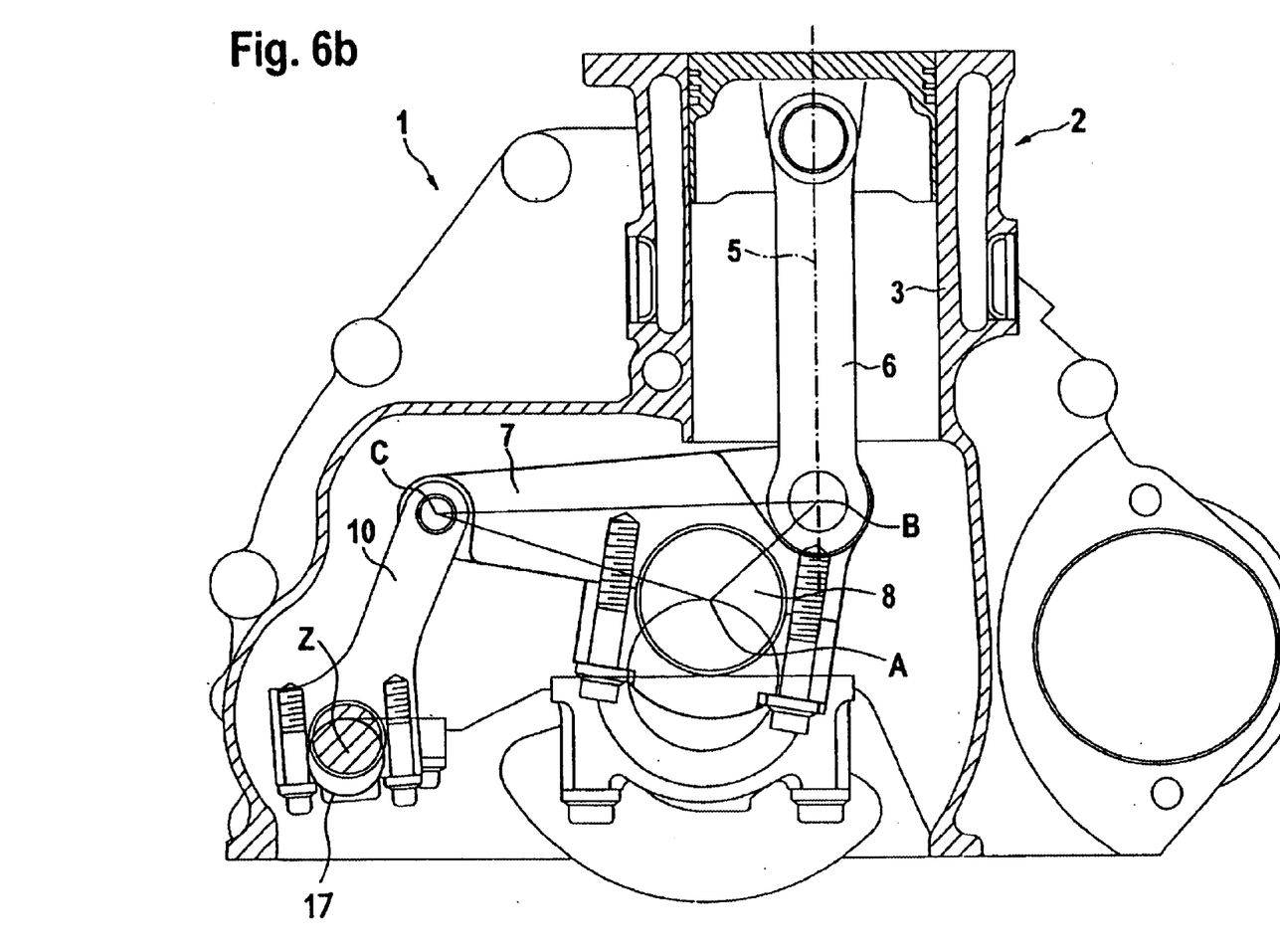
Figure 7A:
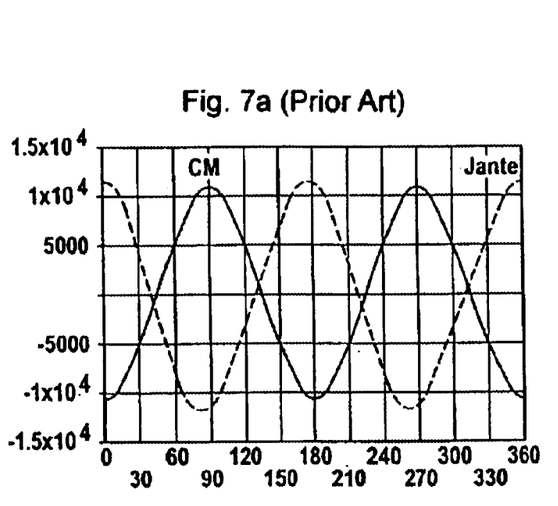
FIGS. 7a, 7b, 7c show the vibration behavior of three prior art engines with variable compression ratios in comparison with that of the arrangement according to the invention, which is shown in FIG. 7d.
Figure 7B:
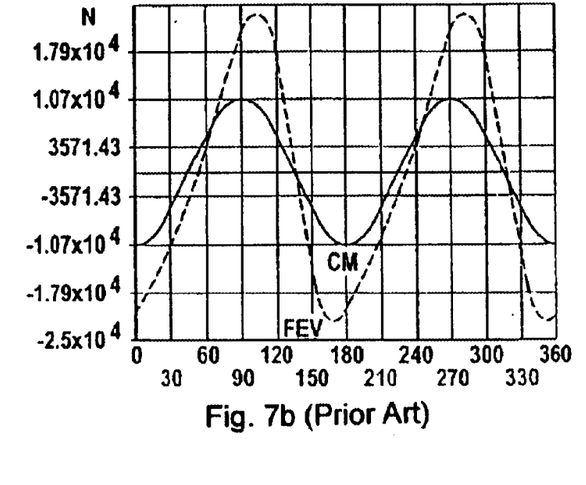
Figure 7C:
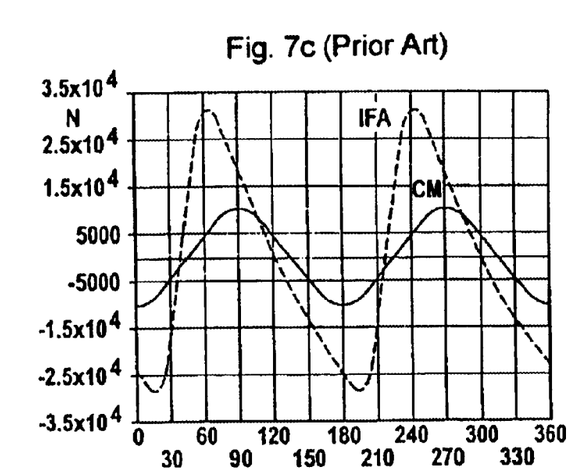
Figure 7D:
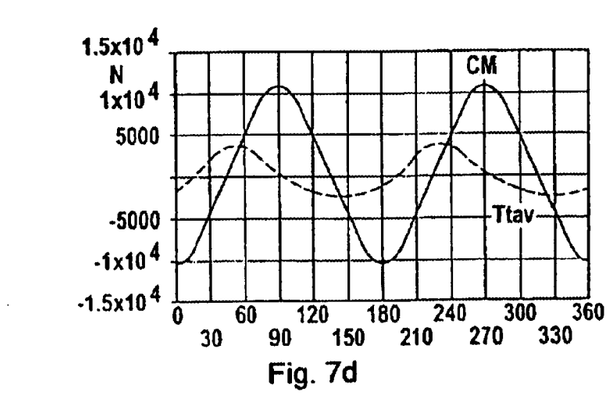

The method of operation of the adjustable crank drive will be explained by means of FIGS. 9a and 9b, which are schematic representations of FIGS. 6a and 6b. During the operation of the internal combustion engine, the piston 4 is moved up and down in a translatory fashion, this movement being transmitted to the connecting rod 6. The connecting rod movement is transmitted via the bearing point B to the transverse lever 7 whose freedom of movement is restricted by the coupling to the control lever 10 at the bearing point C. If the articulation point Z of the control lever 10 is secured, the bearing point C of the transverse lever 7 can be moved on a circular path whose radius corresponds to the length of the control lever 10. The position of the circular path of the bearing point C with respect to the engine casing of the reciprocating piston internal combustion engine is determined by the position of the articulation point Z. When there is a change in the position of the articulation point Z, the position of the circular path, on which the bearing point C can move, changes, whereby the movement paths of the other kinematic variables can be influenced, in particular, the coordinates of the upper dead center of the piston 4. The articulation point Z can advantageously be moved on a circular path. The articulation point Z can also be moved on the predefined control path while the internal combustion engine is operating; it is, of course, also possible to lock the articulation point Z on the control path in any desired positions.

The transverse lever 7 is connected to the crank 8 of the crankshaft 9 via its joint A. The joint A orbits on a circular path whose radius is determined by the length of the crank 8. The joint A is located—with respect to the connecting line between the bearing points B and C of the transverse lever 7—in an intermediate region. Owing to the kinematic connection of the bearing point C via the control lever 10, the translatory movement can be influenced in the direction of the longitudinal axis 5 of the piston 4. The movement of the bearing point B along the longitudinal axis 5 is determined by the movement path of the bearing point C of the transverse lever 7. The influencing of the movement of the bearing point B permits the reciprocating movement of the piston 4 to be controlled by means of the connecting rod 6 so that the position of the piston 4 of its top dead center can be controlled In the exemplary embodiment according to FIG. 9a, the connecting rod 6 and the control lever 10 are both at the same side of the transverse lever 7.

Figure 9A:
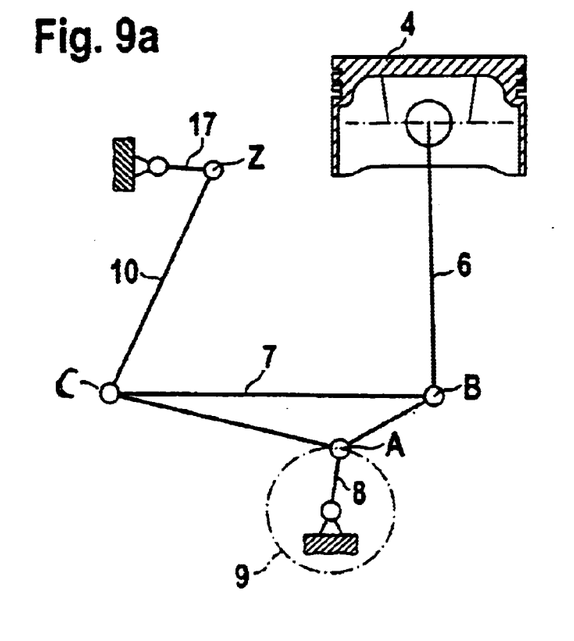
FIGS. 9a and 9b show schematically engines with variable compression ratios including compact operating mechanisms according to FIGS. 6a and 6b.

Downward pivoting of the actuation element formed as an additional crank 17 from the approximately horizontal position shown in FIG. 9a to a, for example, vertical position results in the top dead center of the piston 4 being displaced further upward whereby the compression ratio is increased.

Figure 9B:
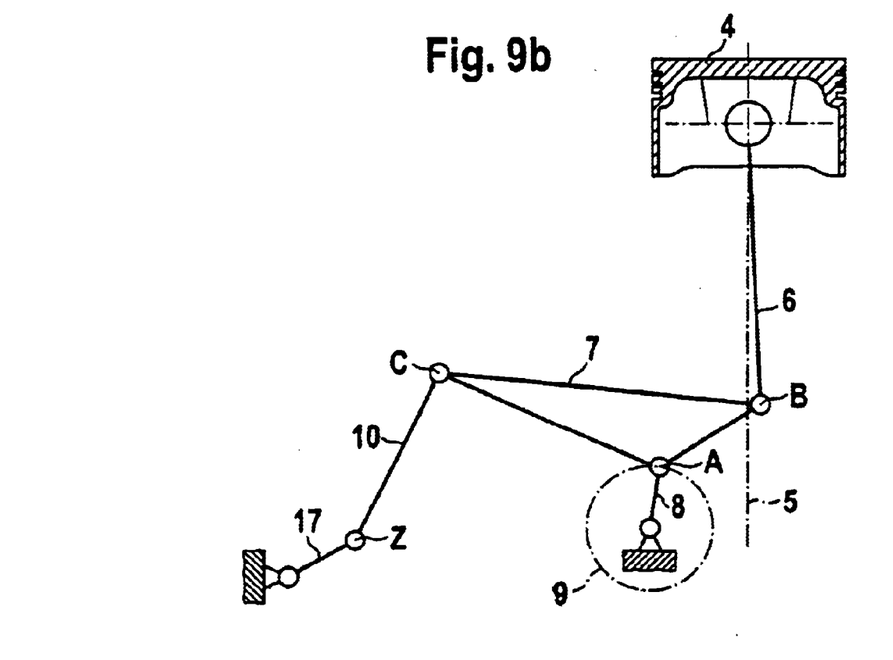

FIG. 9b shows a another embodiment of the internal combustion engine, but with the difference that the control lever 10 and the actuation element which is embodied as an additional crank 17 or the adjustment cam is arranged, with respect to the transverse lever 7, on the side opposite the connecting rod 6. However, otherwise the method of operation of the crank drive corresponds to the method of operation of the crank drive shown in FIG. 9a, in which the control lever and the actuation element are arranged at the same side of the transverse lever 7 as the connecting rod 6.

Figure 10:
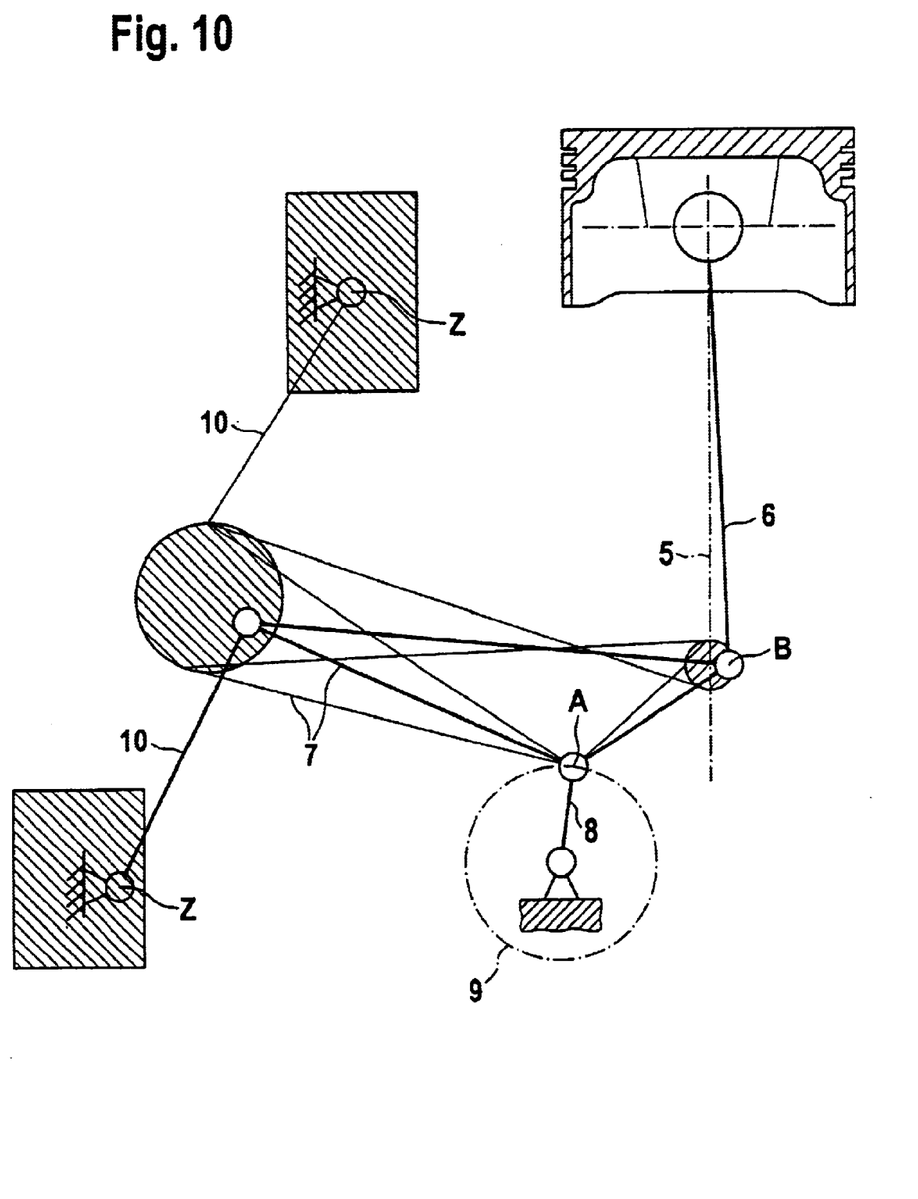
FIG. 10 shows schematically the dimensioning ranges for which a reasonable vibration behavior of the engine can be obtained.

FIG. 10 shows a further schematic illustration of a crank drive of a reciprocating piston internal combustion engine, in which the positions of specific points in the crank drive are shown and in which optimal regions, in which the bearing point B between transverse lever 7 and connecting rod 6, the bearing point C between transverse lever 7 and control lever 10 and the articulation point Z of the control lever 10 can be moved, taking into account the aforesaid optimum value ranges for the lengths and positions of the crank drive, are indicated by hatched areas. Specific size ratios of the geometric lengths and positions of the components of the crank drive have proven advantageous for a particularly smooth running operation of the internal combustion engine with very low loads on individual elements of the crank drive. The proportions of the triangular transverse lever 7 with the lateral lengths a, b, c can be given as follows, as a function of the radius r which refers to the radial length of the crank 8: a being the side length between the connecting rod bearing point B and the control lever bearing point C, b being the side length between the crank joint A and the control lever bearing point C and the side length c referring to the distance between the crank joint A and the connecting rod bearing point B:

$4.0*r \leq a \leq 7.0*r,$ $2.2*r \leq b \leq 5.5*r,$ $1.2*r \leq c \leq 3.5*r.$ The length l of the connecting rod 6, the length k of the control lever 10 and the distance e between the axis of rotation of the crankshaft 9 and the longitudinal axis 5 of the cylinder 4 being dimensioned in a preferred embodiment as follows:

$3.8*r \leq l \leq 5.2*r,$ $2.8*r \leq k \leq 6.2*r,$ $1.1*r \leq e \leq 2.6*r.$ A further optimum size ratio can be given for the case shown in FIG. 9a, in which the connecting rod 6 and control lever 10 are arranged at the same side of the transverse lever 7. The distance f between the cylinder axis 5 and articulation point Z of the control lever 10 at its actuating element and the distance p between the crankshaft axis and articulation point Z being advantageously dimensioned as follows:

$2.8*r \leq f \leq 5.8*r,$ $4.8*r \leq p \leq 9.5*r.$

If the control lever and connecting rod are arranged on opposite sides of the transverse lever (FIG. 9b), the following optimized size specifications can be made for the distance f between the cylinder axis and articulation point Z and the distance p between the crankshaft axis and articulation point Z:

$5.5*r \leq f \leq 8.2*r,$ $-1.0*r \leq p \leq 0.7*r.$

What is claimed is:

1. A reciprocating piston internal combustion engine comprising a cylinder (3), a piston (4) movably disposed in said cylinder (3), a connecting rod (6) connected to said piston (4), a crankshaft (9) with a crank (8), a transmission element (7) disposed between said connecting rod (6) and said crank (8) for transmitting movement of said piston (4) to said crankshaft (9), means for manipulating movement of said transmission element (7) for affecting movement of said piston (4) for changing the compression ratio of said engine, said transmission element (7) being a transverse lever structure (7) coupled to said connecting rod (6) at a first bearing end (B) thereof, a control arm (10) connected with one end to another other end of said transverse lever structure (7) at a second bearing point (C) thereof, said transverse lever structure (7) being further coupled to said crank (8) at a third bearing point (A) thereof disposed between said first bearing point (B) with said connecting rod and said second bearing point (C) with said control arm (10), said transverse lever structure (7) forming a triangle with a side length a between said first bearing point (B) and said second bearing point (C) of said transverse lever structure (7), a side length b between said second bearing point (C) and said third bearing point (A) and a side length c between said first bearing point (B) and said third bearing point A, said lengths a, b, and c having predetermined length values based on the crank radial length r such that:

$4.0*r \leq a \leq 7.0*r,$ $2.2*r \leq b \leq 5.5*r,$ $1.2*r \leq c \leq 3.5*r.$ 2. A reciprocating piston internal combustion engine according to claim 1, wherein said transverse lever structure (7) is a triangular lever with the bearing points (A, B, C) being arranged at the corner points of the triangular lever (7).

3. A reciprocating piston internal combustion engine according to claim 1, wherein a length (l) of said connecting rod (6) and a length (k) of said control arm (10) and a distance (e) between the axis of rotation of the crankshaft (9) and the longitudinal axis of the cylinder (3) are dimensioned—with respect to the crank radius (r)—such that:

$$3.8*r \leq l \leq 5.2*r,$$

$$2.8*r \leq k \leq 5.2*r,$$

$$1.1*r < e \leq 1.9*r.$$

4. A reciprocating piston internal combustion engine according to claim 1, wherein, with the control arm (10) arranged on the same side of the transverse lever structure (7) as the connecting rod (6), a distance (f) between the longitudinal axis of the cylinder (3) and the other end (Z) of the control arm (10), and a distance (p) between the crankshaft axis and said other end (Z) of said control arm (10) are dimensioned—with respect to the crank radius (r)—such that:

$$2.8*r \leq f \leq 4.8*r,$$

$$4.8*r \leq p \leq 7.2*r.$$

5. A reciprocating piston internal combustion engine according to claim 1, wherein, with the control lever (10) and the connecting rod (6) arranged at opposite sides of the transverse lever structure (7), a distance (f) between the longitudinal axis of the cylinder (3) and the other end (Z) of the control arm (10), and a distance (p) between the crankshaft axis and the point (Z) are dimensioned—with respect to the crank radius (r)—such that:

$$5.5*r \leq f \leq 8.2*r,$$

$$-1.0*r \leq p \leq 0.7*r.$$

6. A reciprocating piston internal combustion engine according to claim 1, wherein the control arm (10) is connected with its other end (Z) to a support structure for moving said control arm (10) along a predetermined control path.

7. A reciprocating piston internal combustion engine according to claim 6, wherein said other end (Z) of the control arm (10) is connected to an additional crank (17), which is pivotally supported.

8. A reciprocating piston internal combustion engine according to claim 6, wherein the position of said other end (Z) of the control arm (10) is adjustable by means of a cam.

9. A reciprocating piston internal combustion engine according to claim 7, wherein said other end (Z) of the control arm (10) can be secured at adjustable angular positions of said additional crank (17).

10. A reciprocating piston internal combustion engine according to claim 9, wherein the angular position of the other end (Z) of the control arm (10) is adjustable as a function of engine operating variables and operating parameters.

11. A reciprocating piston internal combustion engine according to claim 10, wherein said other end (Z) of the control arm (10) is movable along a control path synchronized with the crankshaft.

12. A reciprocating piston internal combustion engine according to claim 10, wherein said other end (Z) of the control arm (10) is movable along a control path synchronized with the crankshaft, and the movement is adjustable as a function of engine operating state variables and engine operating parameters.

13. A reciprocating piston internal combustion engine according to claim 12, wherein said other end (Z) of the control arm (10) is movable on said control path synchronized with the crankshaft, with a variable transmission ratio.

* * * * *